United States Patent
Elias et al.

(10) Patent No.: US 7,990,472 B2
(45) Date of Patent: Aug. 2, 2011

(54) GENERALIZED VBI WAVEFORM GENERATOR

(75) Inventors: Gili Elias, Herzliya (IL); Advait Madhav Mogre, Sunnyvale, CA (US); Leonid Bell, Haifa (IL)

(73) Assignee: Broadcom Corporation, Irvine, CA (US)

( * ) Notice: Subject to any disclaimer, the term of this patent is extended or adjusted under 35 U.S.C. 154(b) by 1119 days.

(21) Appl. No.: 11/789,573

(22) Filed: Apr. 25, 2007

(65) Prior Publication Data

US 2008/0266450 A1 Oct. 30, 2008

(51) Int. Cl.
*H04N 7/00* (2011.01)
*H04N 11/00* (2006.01)

(52) U.S. Cl. ......... 348/478; 348/461; 348/466; 348/473

(58) Field of Classification Search .................. 348/461, 348/466, 73, 478
See application file for complete search history.

(56) References Cited

U.S. PATENT DOCUMENTS

| | | | | |
|---|---|---|---|---|
| 5,526,427 A * | 6/1996 | Thomas et al. | ................ | 725/18 |
| 5,579,780 A * | 12/1996 | Zadini et al. | ................ | 600/585 |
| 5,844,615 A * | 12/1998 | Nuber et al. | ............. | 375/240.01 |
| 5,907,366 A * | 5/1999 | Farmer et al. | ................ | 348/478 |
| 6,072,532 A * | 6/2000 | Chieh et al. | ................ | 348/478 |
| 6,160,587 A * | 12/2000 | Walker et al. | ................ | 348/478 |
| 6,351,289 B1 * | 2/2002 | Chen et al. | ................ | 348/478 |
| 6,636,268 B1 * | 10/2003 | Ngai | ............. | 348/478 |
| 6,694,518 B1 * | 2/2004 | Dulac | ............. | 725/136 |
| 6,775,842 B1 * | 8/2004 | Van Gestel | ................ | 725/136 |
| 7,683,930 B2 * | 3/2010 | Tierney et al. | ................ | 348/184 |
| 2004/0100588 A1* | 5/2004 | Hartson et al. | ................ | 348/608 |
| 2005/0058432 A1* | 3/2005 | Kennedy | ............. | 386/81 |
| 2009/0086096 A1* | 4/2009 | Singh et al. | ................ | 348/478 |

* cited by examiner

*Primary Examiner* — Brian Yenke

(74) *Attorney, Agent, or Firm* — McAndrews, Held & Malloy, Ltd.

(57) ABSTRACT

Herein described are at least a method and a system for processing vertical blanking interval (VBI) data such that the VBI data is suitable for transmission to a receiver. The method comprises generating one or more digital symbols at a first frequency, shaping the one or more digital symbols into one or more VBI data samples, first determining a first value that specifies a number of possible points that may be interpolated between two consecutive data samples of the one or more VBI data samples, and second determining a second value that is equal to one plus the number of points skipped before a point of the possible points is selected, and outputting the selected point based on an output frequency. The system may be described as a generalized VBI waveform generator comprising a symbol generator, a shaping filter, and a variable linear interpolator.

20 Claims, 10 Drawing Sheets

GENERALIZED VBI WAVEFORM GENERATOR

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When video programming is broadcast by a service provider, active video as well as vertical blanking interval (VBI) data may be transmitted to a viewer. The vertical blanking interval (VBI) data is encoded into the video stream for transmission by a telecommunications operator. The VBI data may be encoded by a video encoder to conform with one or more VBI transmission standards. Unfortunately, when the VBI data transmission standard is changed to another VBI transmission standard, the frequency and waveform characteristics of the existing VBI transmission may not be compatible to the new standard. Existing technologies may utilize a PLL and a divider circuitry to modify the frequency of the transmission. However, the approach of using such a PLL may not be desirable when the VBI transmission characteristics need to be seamlessly changed to conform to one or more required VBI transmission standards.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and a system for generating vertical blanking interval (VBI) waveforms. The various aspects and representative embodiments of the method and the system are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention can be found in a method and a system to encode VBI (vertical blanking interval) data into a video stream. The video stream may comprise any type of video programming provided by a telecommunications carrier, for example. The VBI data may be encoded for transmission within a vertical blanking interval portion of a data stream provided by a telecommunication service provider. The system that performs the encoding will be referred to as a generalized VBI waveform generator. The VBI data may be transmitted along with active video data. By way of using the generalized VBI waveform generator, the VBI data may be packed or packaged into digital symbols, subsequently filtered, and processed such that the resulting waveform is output at a certain frequency. The resulting waveform may conform to one or more telecommunication standards. The one or more telecommunication standards may comprise AMOL I/II, GEMSTAR, SCTE, or CC (US Closed Caption), for example. The encoding process provided by the various aspects of the invention comprises generating one or more digital symbols, shaping the one or more digital symbols using a shaping filter to generate a shaped and band-limited waveform, and converting the frequency of the shaped and band-limited waveform into a desired frequency. The desired frequency may be compatible with one or more telecommunication standards. The method provides a seamless transition from one VBI standard to another for any sample period within any vertical blanking line of a video stream. For example, the various aspects of the invention may be used to apply a different VBI standard starting at any point within a horizontal scan line of VBI symbols. At any time, the VBI data may be packed into digitized symbols and appropriately modulated to conform to the newly changed standard. Furthermore, the digitized VBI symbols are appropriately shaped and subsequently transmitted at a frequency that conforms to the particular VBI standard that is used.

Figure 1:
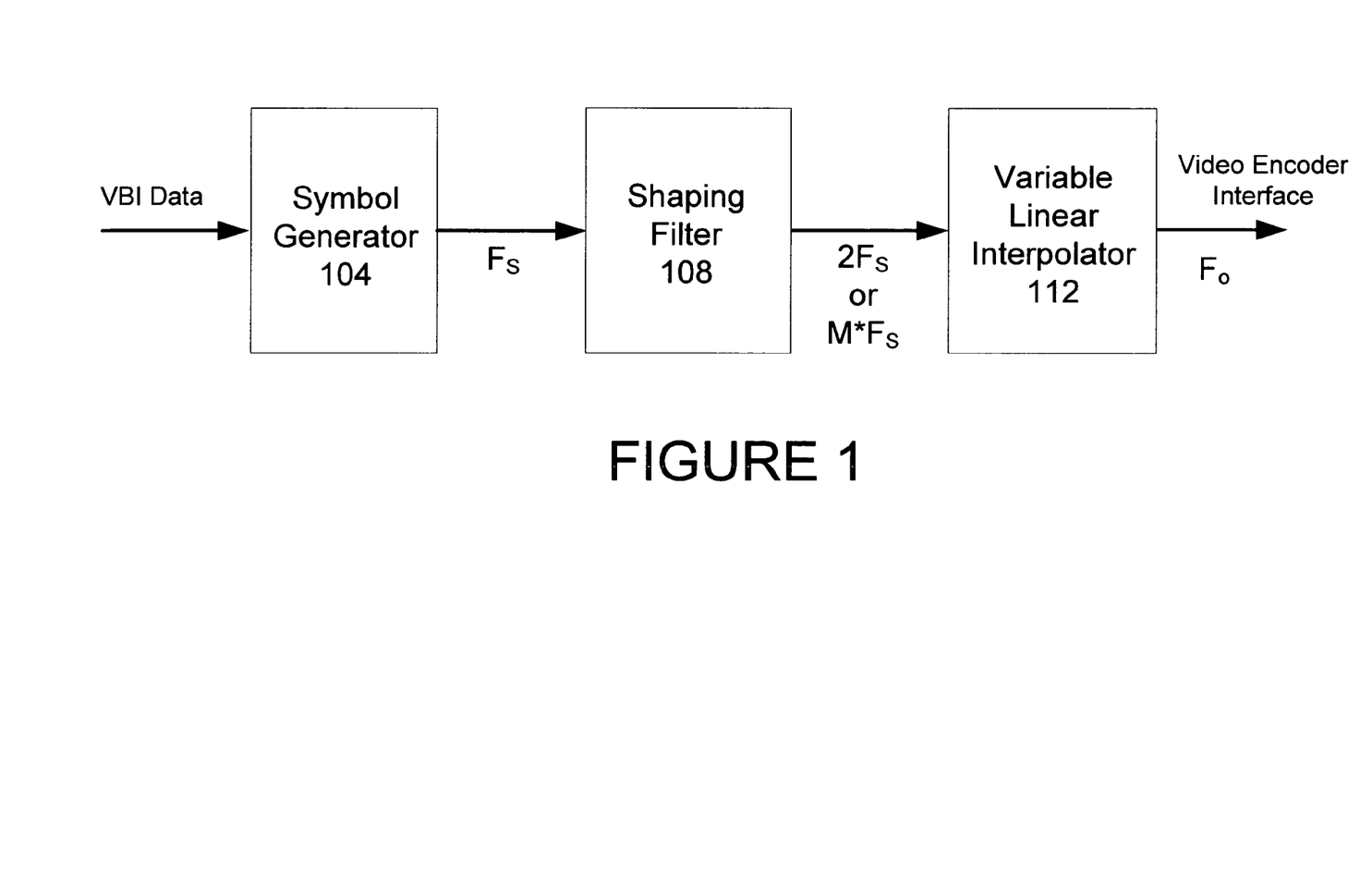
FIG. 1 is a block diagram of a generalized VBI (vertical blanking interval) waveform generator, in accordance with an embodiment of the invention.

FIG. 1 is a block diagram of a generalized VBI (vertical blanking interval) waveform generator, in accordance with an embodiment of the invention. The generalized VBI waveform generator comprises a symbol generator 104, a shaping filter 108, and a variable linear interpolator 112. VBI data, which may be provided by a data computing or processing device, for example, is input into the symbol generator 104. The symbol generator 104 generates one or more digital symbols at a frequency, $F_s$. The symbol generator 104 may comprise a multiplexer used for selecting one or more types of VBI data. The multiplexer may select from one or more inputs provided by one or more data computing or processing devices at the telecommunications service provider. When the VBI data comprises US Closed Caption (CC) data, the VBI data may comprise a CC (closed caption) clock run-in data, a CC start bit, null symbols, and CC payload, for example. The multiplexer may provide an output to a shift register, in which one or more bits may be successively shifted. The one or more bits may be further shifted into one or more flip-flops, such that the one or more bits may be clocked using a common clock pulse to output an n-bit digital symbol, for example. By way of using the shift register and one or more flip-flops, one or more digital symbols may be output to the shaping filter 108. The shaping filter 108 may be used to shape the digital symbols as specified by a VBI standard. In a representative embodiment, the shaping filter may comprise two modes of operation. In the first mode or ISI mode, a time domain symmetrical FIR filter up-samples the received digital symbols internally by a factor of 2 by, for example, stuffing zero symbols between successive pairs of symbols. This operational mode produces a shaped waveform that generates digitized symbols at a rate of $2F_S$. These digitized symbols are subsequently output to the variable linear interpolator 112. This first mode may be used for waveforms prone to intersymbol interference (151) such as PAM based raised cosine or Partial Response Coding (PRC) signaling, for example. In the second mode or non-ISI mode, a Look Up Table (LUT) based transition generator may be used to generate transitions from a previous symbol value to a next symbol value by way of accessing data from a LUT. In the second mode of operation, a shaped waveform is generated at a symbol rate of $M*F_S$ (e.g., M=32). The second operational mode may be used to generate PAM rectangular and CC waveforms, for example. The variable linear interpolator 112 is used to convert the shaped symbols from a rate (of $2F_S$ or $M*F_S$) to a rate $F_O$ by way of variable linear interpolation. The rate, $F_O$, may be specified, for example, by a particular design or a particular VBI standard. The VBI standard may comprise any analog NTSC or PAL standard such as AMOL I/II, GEMSTAR, SCTE, or United States or European CC (closed caption), for example. The variable linear interpolator 112 outputs the frequency converted shaped symbols to a video encoder interface, for example. The frequency converted shaped symbols may be subsequently transmitted to a receiver located at a subscriber's premise, for example.

Figure 2:
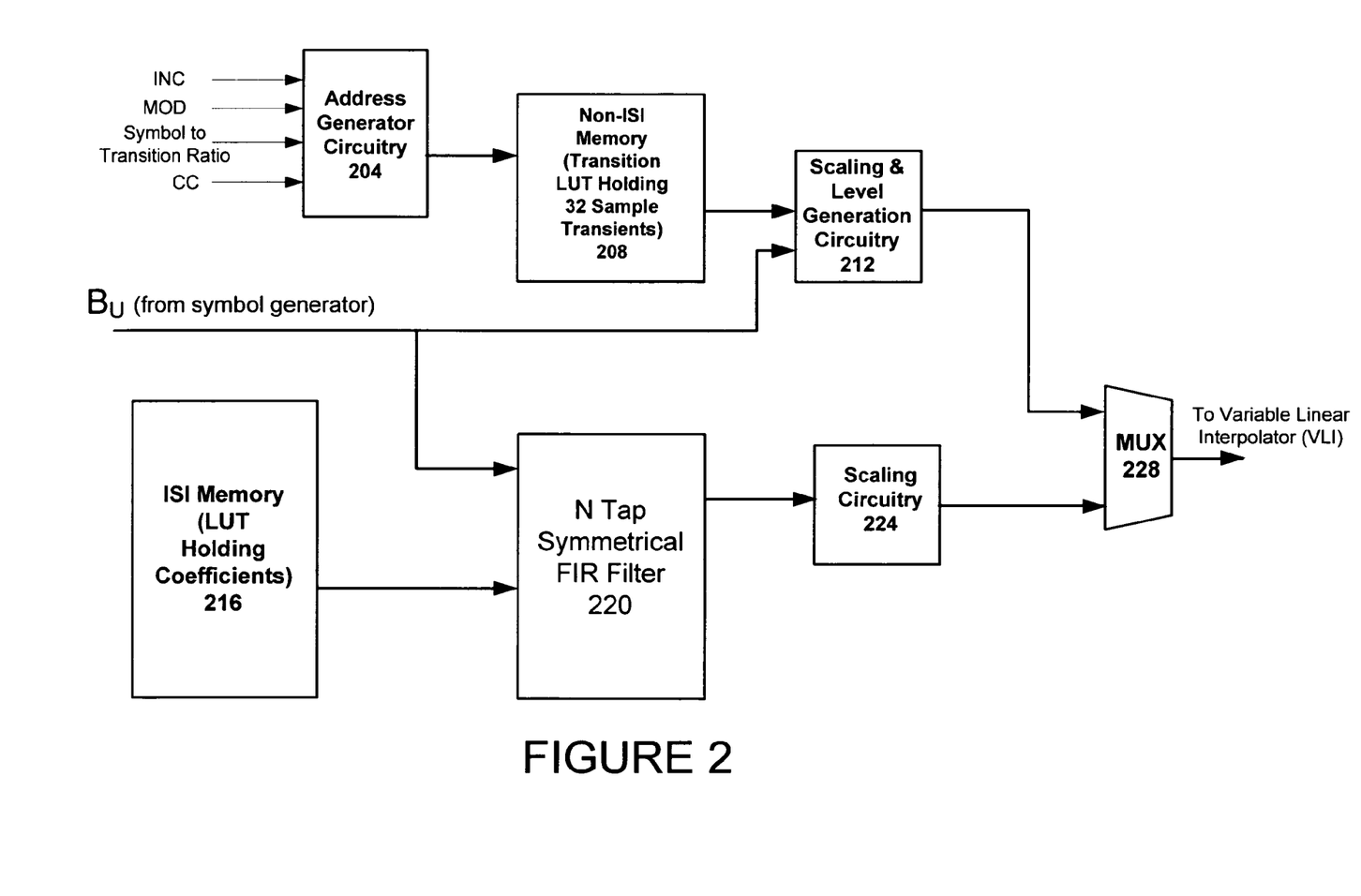
FIG. 2 is a block diagram of a shaping filter used in a generalized VBI waveform generator, in accordance with an embodiment of the invention.

FIG. 2 is a block diagram of a shaping filter used in a generalized VBI waveform generator, in accordance with an embodiment of the invention. The shaping filter comprises a first portion of circuitry and a second portion of circuitry. The first portion comprises an address generator circuitry 204, a non-ISI memory 208, and a scaling and level generation circuitry 212 while the second portion comprises an ISI memory 216, an N-tap symmetrical FIR filter 220, a scaling circuitry 224, and a multiplexer 228. The first portion may be used for shaping symbols in a non-ISI (i.e., a transmission channel less prone to generating intersymbol interference), while the second portion may be used for shaping symbols in the ISI (i.e., a transmission channel generating intersymbol interference) mode. The shaping filter accepts symbols at its input and outputs a shaped and band limited waveform. The shaping filter processes the digital symbols using one or more processing modes. The non-ISI mode may be used for generating and shaping rectangular PAM and other CC (closed caption) waveforms. The intersymbol interference (ISI) for such rectangular PAM and CC waveforms is very low; and as a consequence, each VBI data sample can be generated using one or more symbols that do not need to account for the effects of neighboring symbols. In a representative embodiment of the non-ISI mode, the non-ISI memory 208 comprises a transition look-up table (LUT) that stores an M point (e.g., M=32) raised cosine transient output that is used to directly generate a shaped waveform. The raised cosine transient may be generated using alpha coefficient equal to the value 1. In generating the shaped waveform, the shaping filter may use one or more inputs such as a symbol to transition ratio, for example. In a representative embodiment, the symbol to transition ratio may be considered to be a ratio of the duration of a desired symbol value versus the duration of a transition to the desired symbol value. The shaping filter may also use the symbol rate (INC) or output rate (MOD) as inputs. When using a CC waveform, fixed values may be used for clock run-in and data bits. The address generator circuitry 204 may generate one or more addresses that are used to access values stored in the non-ISI memory 208. The one or more addresses may be used for reading an N-sample symbol from the non-ISI memory 208. The scaling and level generation circuitry 212 receives the values that are read out from the non-ISI memory 208 and also receives the digital symbol values, $B_U$, that are output from the symbol generator. Based on the required symbol rate to be provided by the generalized VBI generator, an appropriate number of samples per symbol is generated by the shaping filter. If, for example, 1440 output samples are to be displayed per line, and if 120 symbols are generated per line, then at most 1440/120=12 samples can be used per symbol. In a representative embodiment, the number of samples may be computed using a ratio between the required symbol rate and a sample clock. The shaping filter may implement the ISI mode by applying the N-tap symmetrical FIR filter 220 to the input symbol sequence to generate the waveform. This ISI processing mode is used, for example, for generating PAM (pulse amplitude modulated) raised cosine and PRC (partial response coding) waveforms. The level of intersymbol interference that is generated in the channel may be very significant when transmitting PAM raised cosine and PRC waveforms; and as a result, the resulting symbols may be affected by adjacent neighboring symbols. For example, in the ISI mode, the filter coefficients may be held in a look-up table (LUT) which has 1 entry for a PRC waveform and 32 entries for a PAM raised cosine waveform. The entries of the LUT are stored in the ISI memory 216. In a representative embodiment, the N-tap symmetrical FIR filter 220 receives and processes a digital symbol value represented as an unsigned number, denoted $B_U$, as well as one or more FIR filter coefficients, as illustrated in FIG. 2. The ISI Memory 216 may generate one or more FIR filter coefficients used by the N-tap symmetrical FIR filter 220. The scaling circuitry 224 may scale the output provided by the N-tap symmetrical FIR filter 220 to a suitable value. The multiplexer 228 is used to select either the input provided by the first portion (non-ISI portion) of circuitry or the second portion (ISI portion) of circuitry of the shaping filter.

Figure 3:
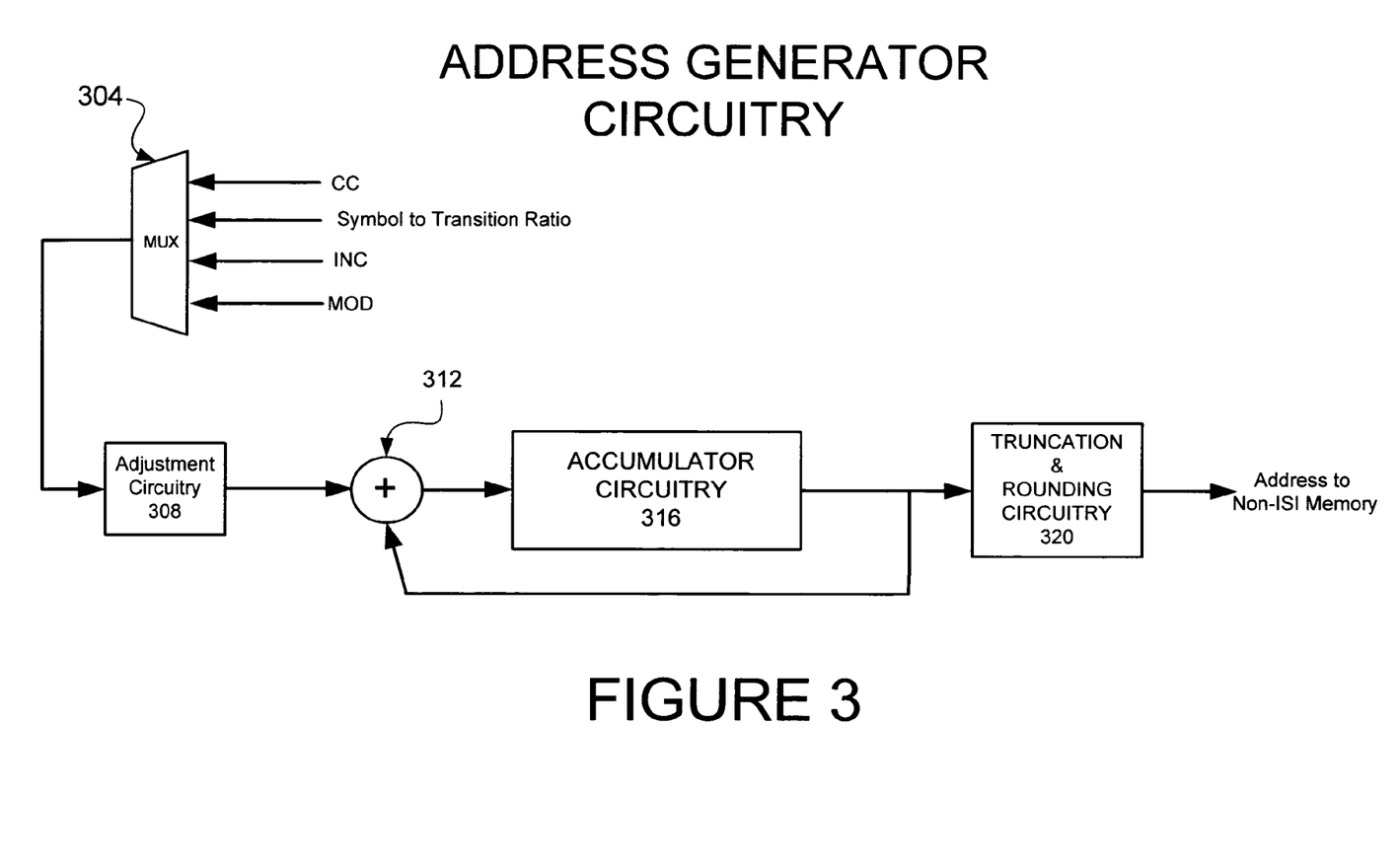
FIG. 3 is a block diagram of an address generation circuitry used in a shaping filter of a generalized VBI waveform generator, in accordance with an embodiment of the invention.

FIG. 3 is a block diagram of an address generation circuitry used in a shaping filter of a generalized VBI waveform generator in accordance with an embodiment of the invention. The address generation circuitry illustrated in FIG. 3 may correspond to the address generation circuitry previously described in FIG. 2. The address generation circuitry comprises a multiplexer 304, which inputs one of several inputs into an adjustment circuitry 308. The adjustment circuitry 308 may adjust the value received from the multiplexer 304 based on the number of samples per symbol. An adder 312 may be used to sum the output of the adjustment circuitry 308 with the output of an accumulator circuitry 316. The accumulator circuitry 316 may be used to accumulate the values that are received from the adjustment circuitry 308. The adder 312 transmits the sum to the accumulator circuitry 316. The output of the accumulator circuitry 316 is transmitted to a truncation and rounding circuitry 320. The truncation and rounding circuitry 320 may be used to scale, invert, and offset the values output by the accumulator circuitry 316.

Figure 4:
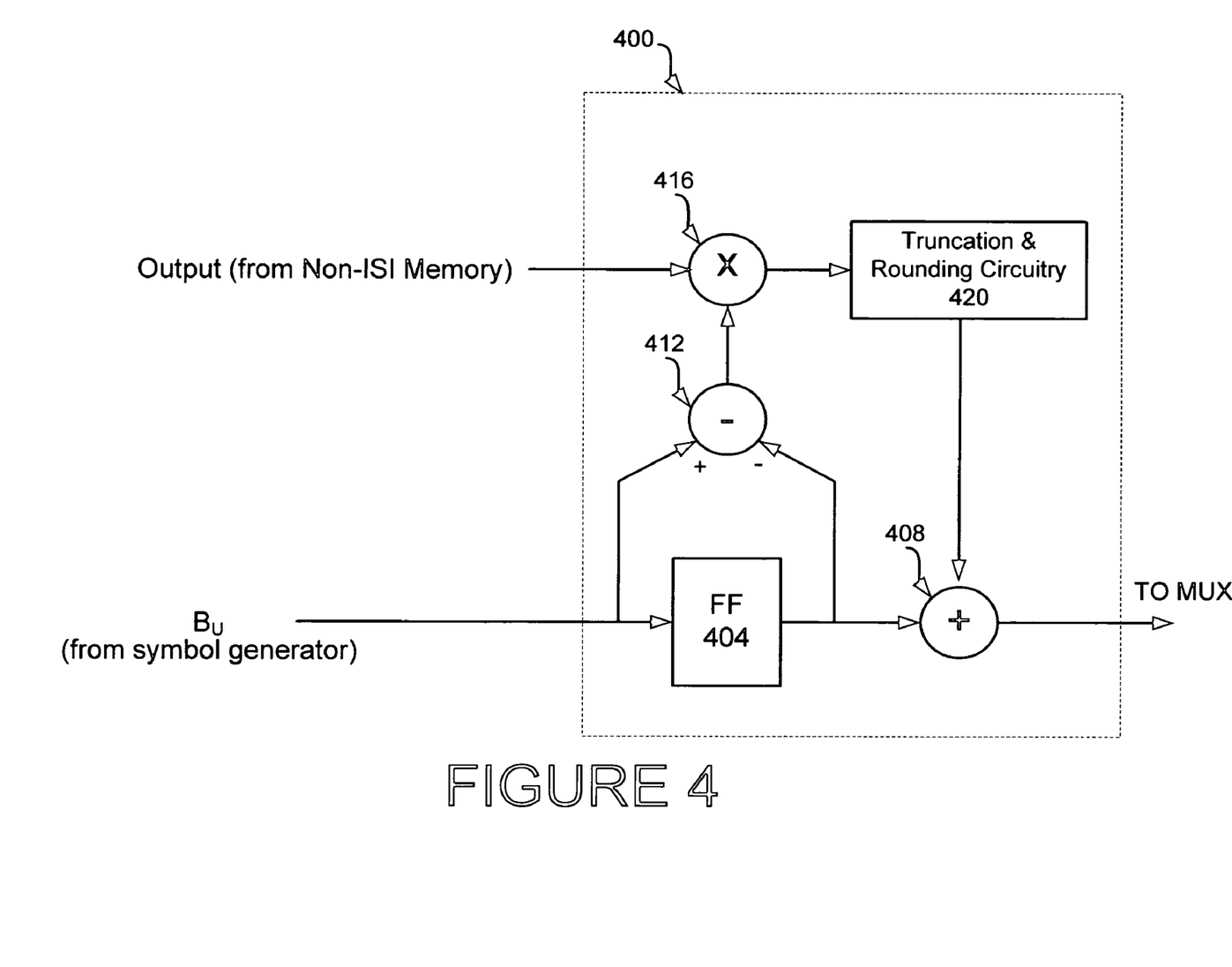
FIG. 4 is a block diagram of a scaling and level generation circuitry of a shaping filter in a generalized VBI waveform generator, in accordance with an embodiment of the invention.

FIG. 4 is a block diagram of a scaling and level generation circuitry 400 of a shaping filter in a generalized VBI waveform generator, in accordance with an embodiment of the invention. The scaling and level generation circuitry 400 comprises a flip-flop (FF) 404, an adder 408, a subtractor 412, a multiplier 416, and a truncation and rounding circuitry 420. The flip-flop 404 may be used to clock consecutive samples of one or more symbols that are generated by the symbol generator. The symbol generator may correspond to the symbol generator previously described in reference to FIG. 1. The difference of the two consecutive samples is computed using the subtractor 412. The subtractor 412 provides the difference to the multiplier 416, where the difference is multiplied by a transient output value obtained from a look-up table (LUT). The LUT may comprise the non-ISI memory previously described in reference to FIG. 2. The transient output may be generated by accessing data stored in the non-ISI memory, as was previously described in reference to FIG. 2. The transient output may comprise a data point from a raised cosine transient, for example. The product of the multiplier 416 is transmitted to the truncation and rounding circuitry 420 where the product is scaled and rounded. The output of the truncation and rounding circuitry 420 and the output of the flip-flop 404 are transmitted to the adder 408. The adder 408 outputs its sum to a multiplexer, such as the multiplexer that was illustrated and described in reference to FIG. 2.

Figure 5:
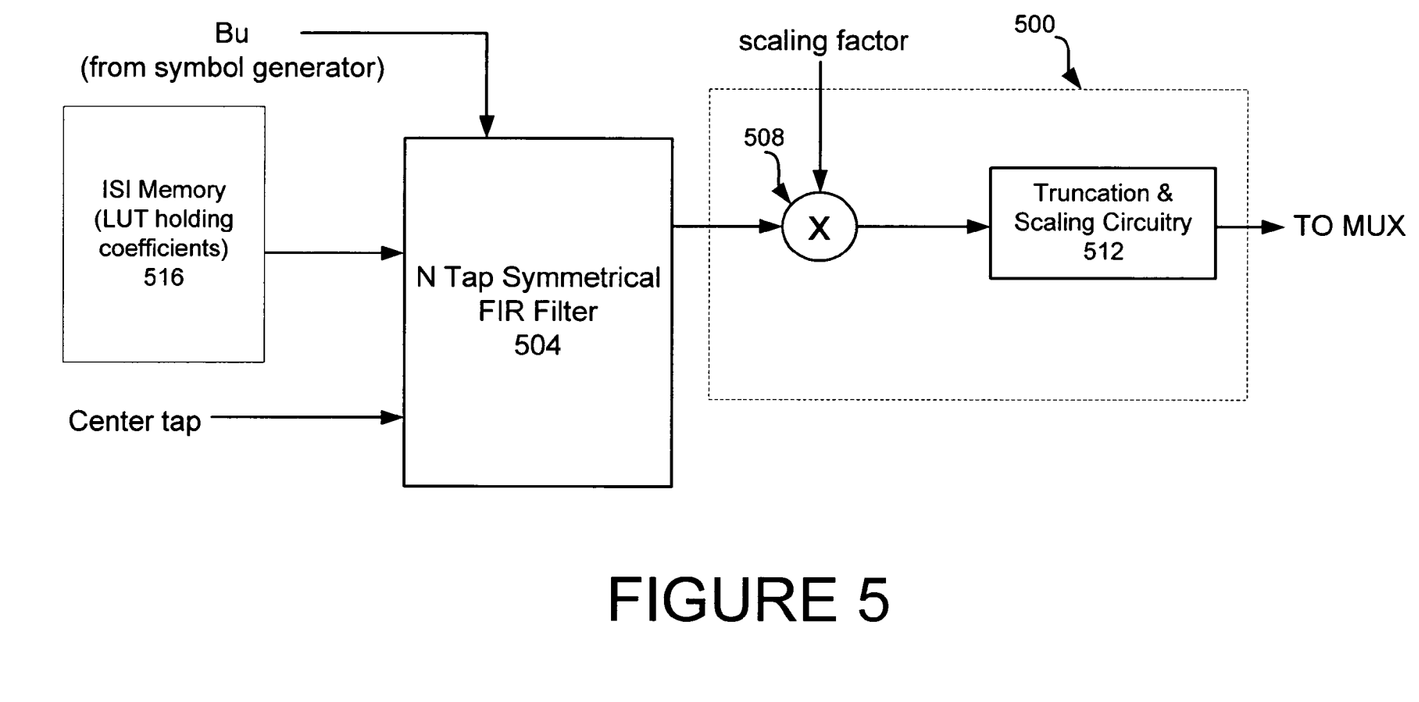
FIG. 5 is a diagram of a second portion of circuitry of the shaping filter previously described in reference to FIG. 2, in accordance with an embodiment of the invention.

FIG. 5 is a diagram of the second portion of circuitry of the shaping filter previously described in reference to FIG. 2, in accordance with an embodiment of the invention. The second portion of circuitry comprises a scaling circuitry 500, an N-tap symmetrical FIR filter 504, and an ISI memory 516. The scaling circuitry 500 comprises a multiplier 508 and a truncation and scaling circuitry 512. As shown, the ISI memory 516 outputs one or more FIR coefficients to the N-tap symmetrical FIR filter 504. In a representative embodiment, the second portion of circuitry is used to oversample the input symbols by a factor of 2, such that there is improved resolution for filtering. The second portion of circuitry provides filtering that smoothes out level transitions of the digital symbols generated by the symbol generator, $B_U$, and limits the bandwidth of the input symbols while accounting for intersymbol interference (ISI). In a representative embodiment, the FIR filter may need to be implemented using signed arithmetic as some of the FIR coefficients, obtained from the ISI memory 516, may be negatively valued. In a representative embodiment, the N-tap symmetrical filter 504 comprises 33 taps. In a representative embodiment, each LUT entry (32 for PAM raised cosine and one for PAM PRC) in the ISI memory 516 comprises 16+1=17 coefficients (16 taps as the filter is symmetrical and the center tap). For raised cosine, for example, each coefficient may comprise an 8 bit signed number in 2's complement notation with the exception of the center tap, which is fixed at a value +128. In a representative embodiment, $B_U$, comprises a 4 bit unsigned value. In a representative embodiment, an 8 bit scaling factor is multiplied by the output of the N-tap symmetrical FIR filter 504 using the multiplier 508. The truncation and scaling circuitry 512 may further scale and truncate a value provided by the multiplier 508.

Figure 6:
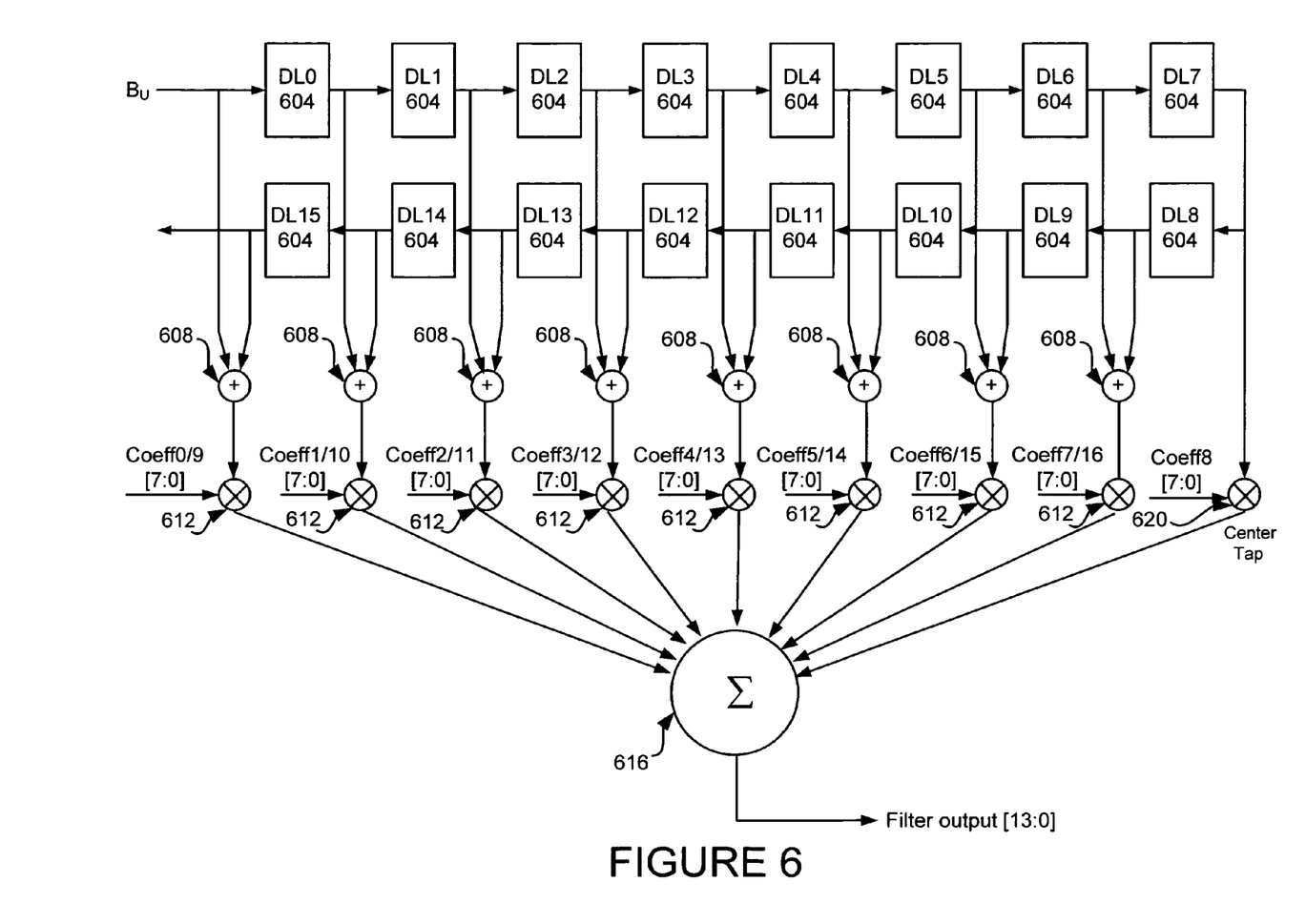
FIG. 6 is a block diagram illustrating an implementation of a 33-tap FIR filter resident in a shaping filter of a generalized VBI waveform generator, in accordance with an embodiment of the invention.

FIG. 6 is a block diagram illustrating an implementation of a 33-tap FIR filter in a shaping filter of a generalized VBI waveform generator, in accordance with an embodiment of the invention. The 33-tap filter comprises a plurality of delay elements (e.g., flip-flops) 604, a plurality of adders 608, a plurality of multipliers 612, a center tap multiplier 620, and a summer 616. Each of the outputs of the plurality of delay elements 604 are input into the plurality of adders 608, as shown, such that each of the plurality of adders 608 generates a sum. Each of the adders 608 outputs its sum into its respective multiplier 612 and center tap multiplier 620. As illustrated, each of the multipliers 612 and center tap multiplier 620 receives a filter coefficient. The filter coefficient may be accessed from a look-up table (LUT) that is implemented using a memory. The product of the each of the plurality of multipliers 612 is output into a summer 616 where a summation of all products over all filter coefficients is performed. In the representative embodiment of FIG. 6, the 33-tap FIR filter is implemented using approximately half the amount of circuitry by way of clocking the delay elements 604 over even and odd clock cycles. As illustrated in FIG. 6, filter coefficients 0-7 may be clocked into the multipliers 612 during an even/odd clock cycle while filter coefficients 9-16 may be clocked into the multipliers 612 during an odd/even clock cycle.

Figure 7A:
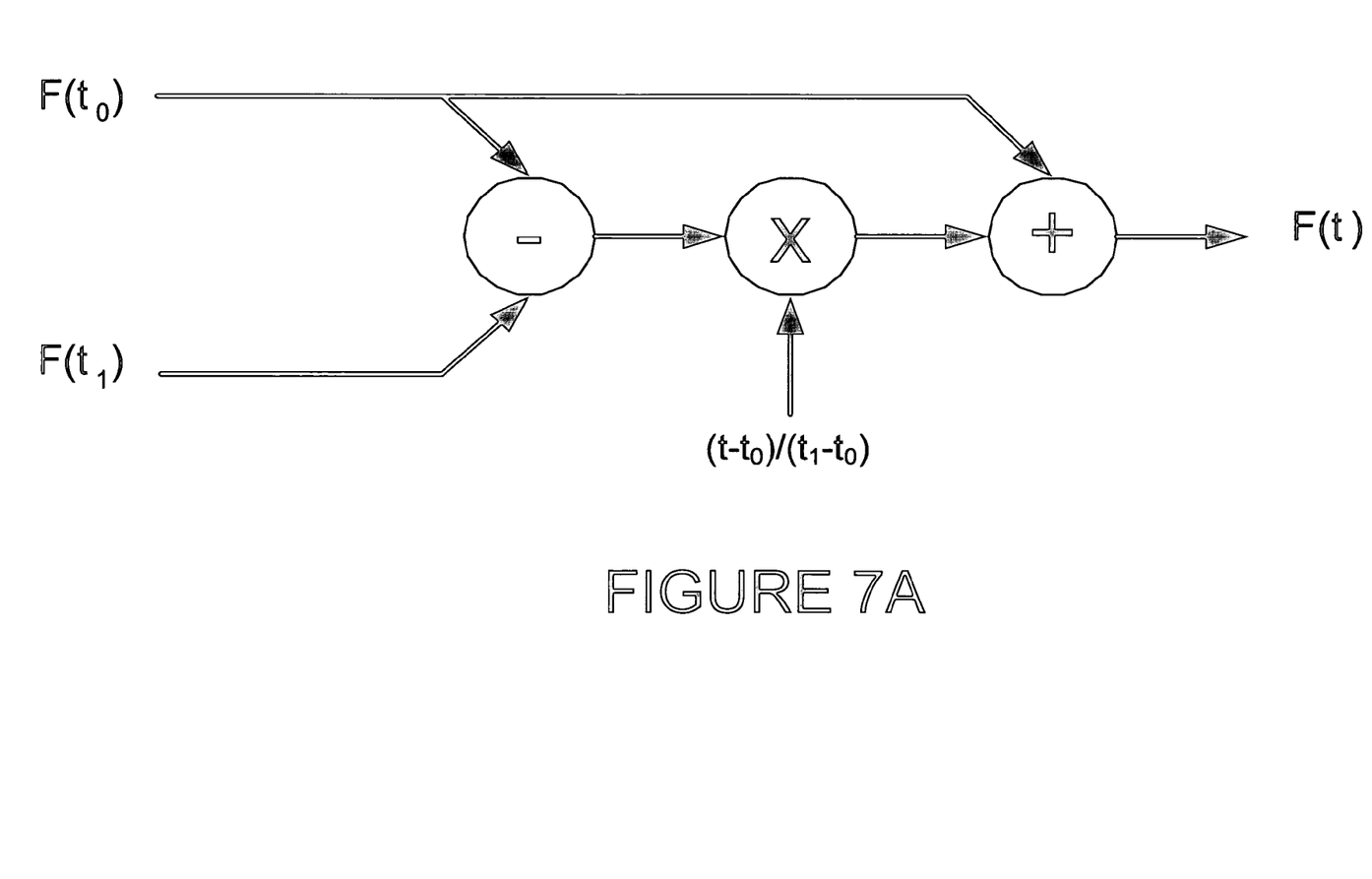
FIGS. 7A and 7B are diagrams that describe linear interpolation performed by a variable linear interpolator, in accordance with an embodiment of the invention.
Figure 7B:
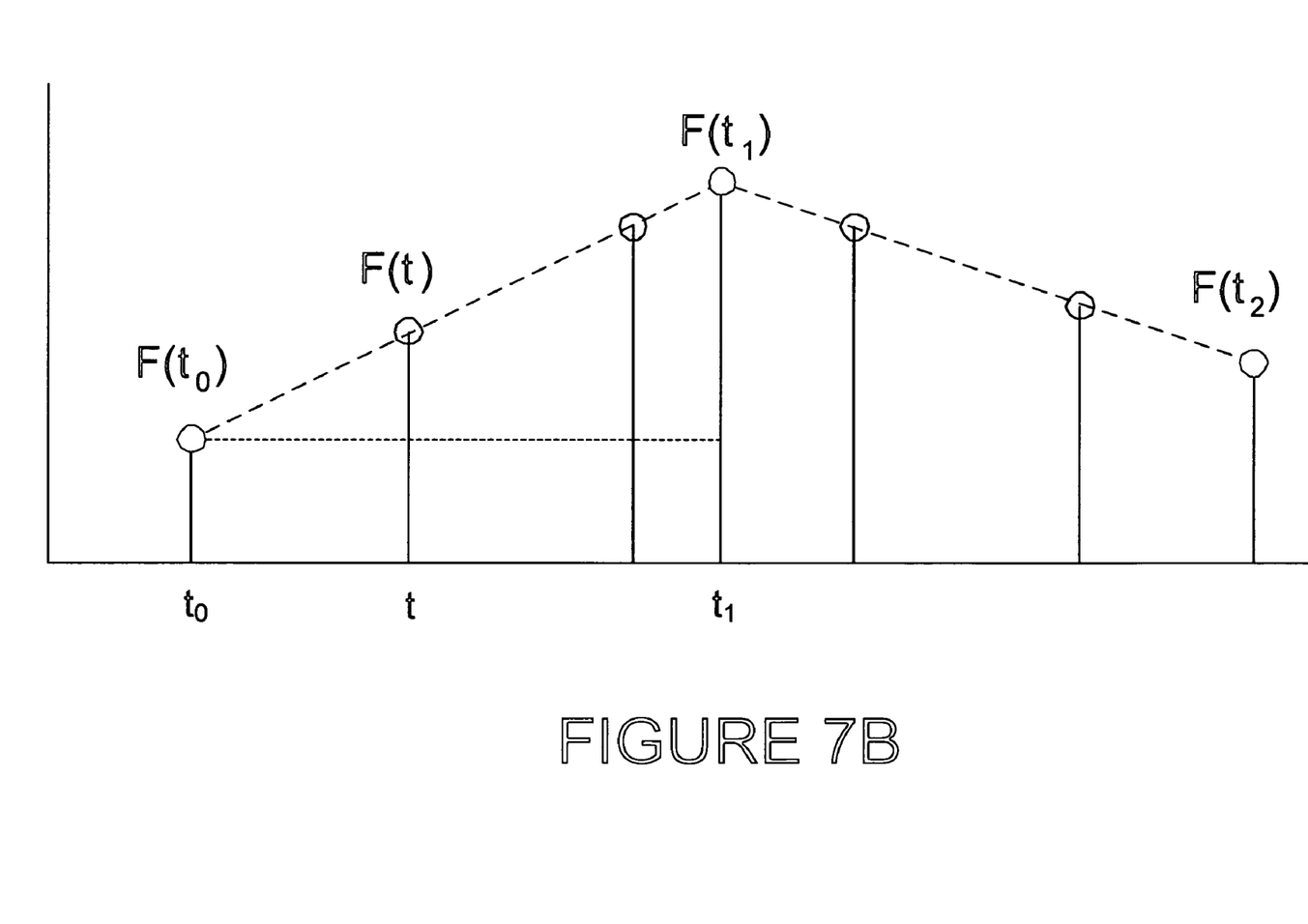

FIGS. 7A and 7B are diagrams that describe linear interpolation performed by a variable linear interpolator in accordance with an embodiment of the invention. As illustrated in FIG. 7A, an interpolation may be performed for computing a value for a function, F(t), given the values for $F(t_1)$ and $F(t_0)$. A difference is computed by subtracting $F(t_0)$ from $F(t_1)$. Next, the difference is multiplied by the ratio $(t-t_0)/(t_1-t_0)$, to yield a product, $[F(t_1)-F(t_0)][(t-t_0)/(t_1-t_0)]$. Finally, the value $F(t_0)$ is added to this product to yield F(t). FIG. 7B describes the above process graphically where the values for t are shown on the abscissa axis while the values for F(t) are shown on the ordinate axis. As illustrated in FIG. 7B, F(t) is determined by interpolating between the known values, $F(t_1)$ and $F(t_0)$. With respect to the generalized VBI waveform generator, B(t) may be used to represent the symbol samples generated by the symbol generator while the values represented by $B(t_1)$ and $B(t_0)$, may correspond to the first two consecutive samples generated by the symbol generator or shaping filter previously described in reference to FIGS. 1 and 2.

Figure 8:
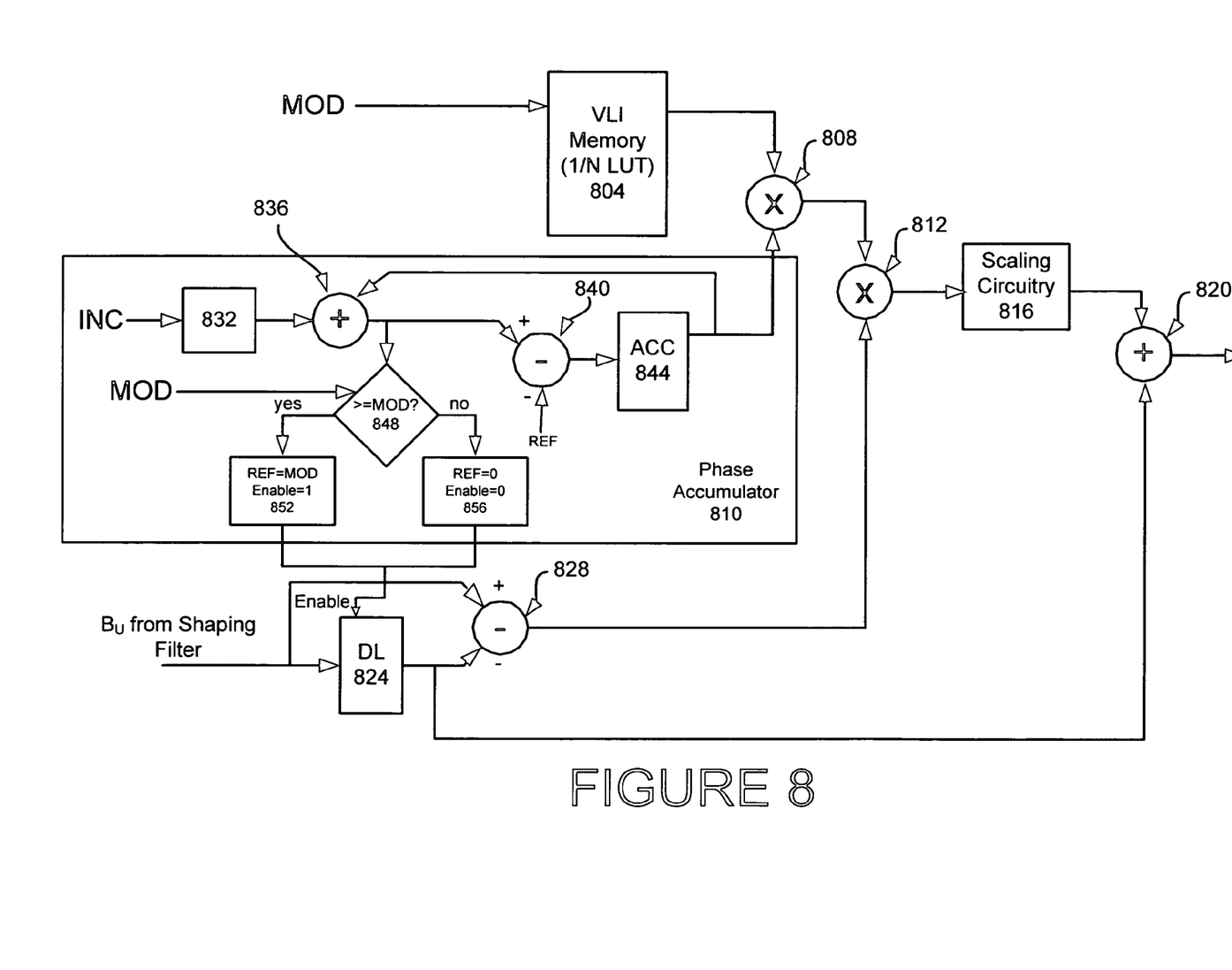
FIG. 8 is a block diagram of an implementation of a variable linear interpolator used in a generalized VBI waveform generator, in accordance with an embodiment of the invention.

FIG. 8 is a block diagram of an implementation of a variable linear interpolator used in a generalized VBI waveform generator, in accordance with an embodiment of the invention. The variable linear interpolator comprises a VLI memory 804, a first multiplier 808, a second multiplier 812, a scaling circuitry 816, a first adder 820, a delay element 824, a first subtractor 828, a $2^K$ multiplier 832, a second adder 836, a second subtractor 840, an accumulator register 844, a comparator logic circuitry 848, a first logic circuitry 852, and a second logic circuitry 856. The VLI memory 804 receives a first parameter, MOD, that specifies the modulus or number of equally spaced temporal points (i.e., along the time axis) between two successive samples that are received from the shaping filter described in reference to FIGS. 1 and 2. The MOD parameter may be used to determine the resolution of an interpolation along the time axis, that is provided by the variable linear interpolator. The interpolation occurs between two successive samples output by the shaping filter. The first parameter, MOD, may be specified by a user based on a particular vertical blanking interval (VBI) specification. The VBI specification may be based on an analog PAL or NTSC VBI standard such as European Closed Caption (CC), AMOL-I/II, GEMSTAR, or US/European Closed Caption (CC), or SCTE, for example. In a representative embodiment, MOD may be input as an address to the VLI memory 804. The VLI memory 804 may be used to store and access the reciprocal of MOD, or the value, 1/MOD (i.e., the ratio of the symbol/samples). The value 1/MOD is input as a first factor of the first multiplier 808. The phase accumulator 810 provides a second factor of the first multiplier 808. The product or output of the first multiplier 808 is transmitted as a factor to the second multiplier 812. The output of the first subtractor 828 provides a factor to the second multiplier 812. The scaling circuitry 816 may be used to perform truncation and/or rounding of the product of the second multiplier 812. The output of the scaling circuitry 816 is input into the first adder 820. In conjunction with the use of the delay element (DL) 824, the first subtractor 828 outputs a value, $B(t_1)-B(t_0)$, as one of the factors used by the second multiplier 812. As mentioned previously, the phase accumulator 810 comprises the $2^K$ multiplier 832, a second adder 836, a second subtractor 840, an accumulator register 844, a comparator logic circuitry 848, a first logic circuitry 852, and a second logic circuitry 856. The $2^K$ multiplier 832 receives a second parameter, INC, that specifies a sampling increment used for sampling the modulus. INC may be defined to be equal to one plus the number of points skipped before a point of the number of equally spaced points is selected for sampling. For example, if the MOD (modulus) or number of equally spaced interpolated points between consecutive samples is 10 and the INC (increment) is 2, then of the 10 points, the points that are interpolated are points at t=2, 4, 6, 8, and 10. The output frequency, $F_o$, is increased by a factor of 5 as a result of setting MOD=10 and INC=2 (i.e., [MOD/INC]=5). The $2^K$ multiplier 832 multiplies INC by $2^K$ or shifts the value of the second parameter k binary digits to the right according to the oversampling mode dictated by the VBI standard used. For example, when the generalized VBI generator generates PAM raised cosine or PRC type waveforms, k is set to the value 1. When the VBI generator generates PAM rectangular waveforms, k may be set to a value 5 corresponding to oversampling at a rate of 32 samples per symbol. When the VBI generator generates a closed caption (CC) waveform, k may be set to the value 4, for example. Hence, the value for k may be set based on the waveform that is generated by the generalized VBI generator. The output of the $2^K$ multiplier 832 is transmitted to the second adder 836 where it is added to the output of the accumulator register 844. The output of the second adder 836 is transmitted to the comparator logic circuitry 848 where a decision is made if this output is greater than or equal to the value of the first parameter, MOD. MOD may be provided as an input to the comparator logic circuitry 848. If the value of the sum generated by the second adder 836 is greater than or equal to MOD, the first logic circuitry 852 sets a first variable (REF) equal to MOD and a second variable (Enable) equal to the value 1. Otherwise, if the value of the sum that is generated by the second adder 836 is less than MOD, REF is set to the value 0 while Enable is set to 0. Furthermore, when the output of the second adder 836 is greater than or equal to MOD, REF (i.e., REF=MOD) is subtracted from the output of the second adder 836 using the second subtractor 840, and the difference is stored in the accumulator register 844. Furthermore, the delay element 824 is enabled when the output of the second adder 836 is greater than or equal to MOD. As illustrated, the delay element 824 receives samples (i.e., $B_U$) provided by the shaping filter. The amplitude of the samples may be represented as a function of time, B(t), such that the first subtractor 828 computes the difference between successive symbol samples when the delay element 824 is enabled. For the first two samples received, for example, the factor provided to one of the two inputs of the second multiplier 812 (i.e., the input provided by the first subtractor 828) may be represented by the value $B(t_1)-B(t_0)$. The accumulator register 844 interpolates a point in time between two consecutive or successive samples generated by the shaping filter. This point in time (e.g., $t_{int}-t_0$) is, of course, based on INC and MOD. In this manner, an interpolated point between two successive samples output by the shaping filter, may be easily generated. Furthermore, given a MOD, the input parameter, INC, may be chosen to conform to a desired output frequency, $F_O$, provided by the variable linear interpolator. Of course, the output frequency, $F_O$, may conform to a particular VBI standard. In accordance with the various aspects of the invention, INC and MOD is related to the symbol frequency, $F_S$, and the output frequency, $F_O$, such that the following equation holds:

$$\frac{INC}{MOD} = \frac{Fs}{Fo}.$$

In accordance with the various aspects of the present invention, the value for MOD may be varied at any time while the VBI data samples are transmitted by the VBI waveform generator. Similarly, the value for INC may be varied at any time. As a consequence, the output frequency may be varied at any point in time while data samples are transmitted during a vertical blanking interval. For example, the output frequency, $F_O$, may be varied at any point in vertical blanking line by way of using the MOD and/or INC signal.

Figure 9:
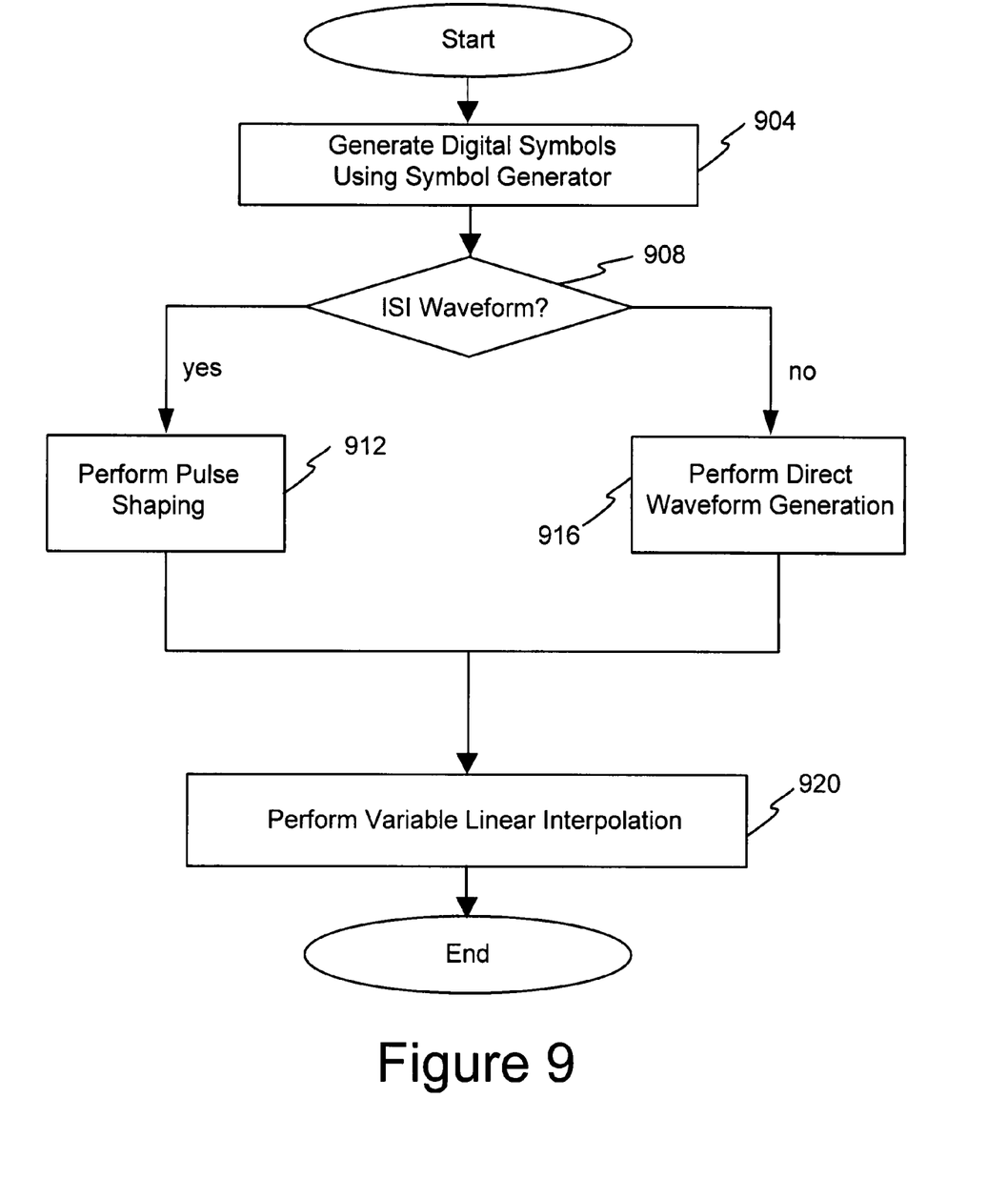
FIG. 9 is an operational flow diagram illustrating a method for generating vertical blanking interval video data using a generalized VBI waveform generator, in accordance with an embodiment of the invention.

FIG. 9 is an operational flow diagram illustrating a method for generating vertical blanking interval (VBI) video data that conforms to one or more VBI standards, using a generalized VBI waveform generator, in accordance with an embodiment of the invention. The process starts at step 904, in which digital symbols are generated by a symbol generator of the generalized VBI waveform generator. Next, at step 908, a determination is made, as to whether the VBI data to be transmitted, is prone or susceptible to intersymbol interference during VBI data transmission through a communications channel. The VBI data may be transmitted to any appropriate receiver using wireless or wireline form of transmission, for example. If the VBI data or waveform to be transmitted is prone to intersymbol interference, the process continues at step 912, at which, pulse shaping is performed using a shaping filter. In a representative embodiment, the shaping filter comprises an N-tap symmetrical FIR filter used for pulse shaping. The N-tap symmetrical FIR filter may comprise a 33-tap filter, for example. Otherwise, the process continues with step 916, at which a direct waveform generation process is performed using a shaping filter. In a representative embodiment, the shaping filter may comprise using a memory that functions as a look-up table (LUT). The memory may store an M-entry transient such as a 32-point raised cosine transient, for example. In either case (i.e., step 912 or 916), the process continues with step 920. At step 920, a linear interpolation of two consecutive samples received from the shaping filter is performed in conformance with a VBI standard. The VBI standard may comprise a standard from any analog NTSC or PAL standard such as AMOL I/II, GEMSTAR, SCTE, United States or European CC (closed caption), or any Teletext or other European standards (e.g., TTX, NABTS) and/or other types of standards (e.g., WSS, CGMS), for example. The VBI standard may specify the required transmission frequency of the transmitted VBI samples. The VBI data may be transmitted by way of using the generalized VBI waveform generator, and subsequently received and decoded a suitable receiver.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of processing data for transmission over a vertical blanking interval (VBI), said method comprising:
   generating one or more digital symbols at a first frequency;
   shaping said one or more digital symbols into one or more data samples using a digital filter;
   first determining a first number of equally spaced temporal points between two consecutive samples of said one or more data samples;
   second determining a second number that corresponds to a sampling increment for sampling said first number;
   computing a ratio that is equal to said first number divided by said second number; and
   outputting said one or more data samples at a second frequency that is equal to said first frequency multiplied by said ratio.

2. The method of claim 1 wherein said shaping is performed based on whether said one or more data samples are susceptible to intersymbol interference when said one or more data samples are transmitted through a communications channel.

3. The method of claim 1 wherein said digital filter comprises an N-tap symmetrical FIR filter used for transmitting said one or more data samples through a communications channel.

4. The method of claim 3 wherein said N-tap symmetrical FIR filter comprises a 33-tap symmetrical FIR filter.

5. The method of claim 1 wherein said shaping utilizes an M-entry transient stored in a memory, said memory implementing a look-up table.

6. The method of claim 5 wherein said memory stores an M-point raised cosine transient.

7. The method of claim 6 wherein M=32.

8. The method of claim 1 wherein said second frequency corresponds to a data transmission frequency associated with US closed caption (CC) data.

9. The method of claim 1 wherein said second frequency corresponds to a data transmission frequency associated with AMOL I/II data.

10. The method of claim 1 wherein said second frequency corresponds to a data transmission frequency associated with GEMSTAR.

11. The method of claim 1 wherein said second frequency corresponds to a data transmission frequency associated with SCTE.

12. A system for processing vertical blanking interval (VBI) data for transmission to a receiver comprising:
    a symbol generator for generating one or more digital symbols at a first frequency;
    a filter for generating one or more VBI data samples using said one or more digital symbols, said filter selectively processing said one or more digital symbols for transmission through a channel based on whether said channel generates intersymbol interference (ISI); and
    a variable linear interpolator for transmitting said one or more VBI data samples at a second frequency.

13. The system of claim 12 wherein a first ratio is equal to a second ratio, said first ratio equal to said second frequency divided by said first frequency, said second ratio equal to a first value divided by a second value, said first value specifying a first number of equally spaced temporal points between two consecutive VBI data samples of said one or more VBI data samples, said second value equal to a second number that corresponds to a sampling increment for sampling said first value.

14. The system of claim 12 wherein said symbol generator comprises one or more shift registers.

15. The system of claim 12 wherein said filter comprises:
    an N-tap symmetrical finite impulse response (FIR) filter; and
    a memory used to store an M-entry transient.

16. The system of claim 15 wherein said M-entry transient comprises a 32-point raised cosine transient.

17. The system of claim 12 wherein said second frequency corresponds to that used for transmitting said VBI data samples over SCTE.

18. The system of claim 12 wherein said second frequency corresponds to that used for transmitting said VBI data samples over US or European Closed Caption (CC).

19. The system of claim 12 wherein said second frequency corresponds to that used for transmitting said VBI data samples over AMOL-I/II.

20. The system of claim 12 wherein said second frequency corresponds to that used for transmitting said VBI data samples over GEMSTAR.

* * * * *